Inventor
Alan Sydney Chester
By
Cushman, Darby & Cushman
Attorneys

Alan Sydney Chester
Inventor
By
Cushman, Darby & Cushman
Attorneys

Inventor
Alan Sydney Chester
By
Cushman, Darby & Cushman
Attorneys

Nov. 30, 1965 A. S. CHESTER 3,221,265

CRYSTAL FILTER CIRCUITS

Filed Aug. 16, 1962 5 Sheets-Sheet 4

Inventor
Alan Sydney Chester
By
Cushman, Darby & Cushman
Attorneys

Nov. 30, 1965 A. S. CHESTER 3,221,265

CRYSTAL FILTER CIRCUITS

Filed Aug. 16, 1962 5 Sheets-Sheet 5

Inventor
Alan Sydney Chester
By
Cushman, Darby & Cushman
Attorneys

United States Patent Office 3,221,265

Patented Nov. 30, 1965

3,221,265

CRYSTAL FILTER CIRCUITS

Alan Sydney Chester, Malvern, England, assignor to Minister of Aviation, in Her Majesty's Government of the United Kingdom of Great Britain and Northern Ireland, London, England Filed Aug. 16, 1962, Ser. No. 217,364
Claims priority, application Great Britain, Aug. 29, 1961, 31,047/61
6 Claims. (Cl. 330—185)

Figure 1:
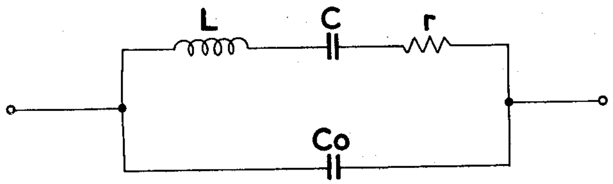

This invention relates to crystal filters and has reference to filters of this type employing quartz crystals.

It can be shown that for a simple filter circuit consisting of a crystal filter element (e.g., a quartz crystal) and a resistive termination and fed from a signal source of zero impedance the theoretical bandwidth $\Delta f$ (between $-3$ db points) is given by $fo/\Delta f=\omega_0 L/(Ro+r)$. The effect of parallel resonance may be reduced materially by the use of a neutralising capacitor fed in antiphase to the crystal. If the parallel capacitance $Co$ of the crystal equals the neutralising capacitor value $Cn$ the notch in the crystal characteristic due to parallel resonance may be offset to give a symmetrical response.

Alhtough the effect of parallel resonance may be thus offset both the capacitances $Co$ and $Cn$ are virtually shunted across the resistive termination and this proves to be a limitation on the bandwidth obtainable. Moreover any capacitance occurring across the output of the crystal due to a circuit to which it feeds causes further bandwidth limitation.

According to the invention therefore a crystal filter comprises a crystal filter element fed from an input signal source and itself feeding to an amplifier of the virtual-earth type, and input series resistance to the amplifier providing a resistive termination for the crystal filter element, and an antiphase neutralising capacitative path having a series resistance corresponding in value to the resistive value of the resistive termination and connected between the input signal source and the virtual-earth point of the amplifier.

According to the invention in a further, more developed aspect a two crystal filter comprises a pair of crystal filter elements each connected in a series circuit with a terminating resistor and means for feeding the elements in antiphase from an input signal source, wherein the output of each element is connected through its terminating resistor to the virtual-earth point of a common virtual-earth feedback amplifier, the terminating resistors constituting series input resistors at the output of each filter element for the feedback amplifier.

According to the invention in a still further developed aspect a multiple filter of $n$ filters comprises a parallel sequence of $n+1$ crystal filter elements, means for feeding the elements alternately in sequence in antiphase from a common signal source, each element feeding to a common connection of a pair of terminating resistors and $n$ amplifiers of the virtual-earth type, wherein the terminating resistors at the beginning and end of the sequence are connected to a point of earth potential, the other resistors are connected in pairs in order along the sequence after the earthed resistor at the beginning and the connection from each pair is connected to the virtual earth point of a different one of the feedback amplifiers.

Figure 2:
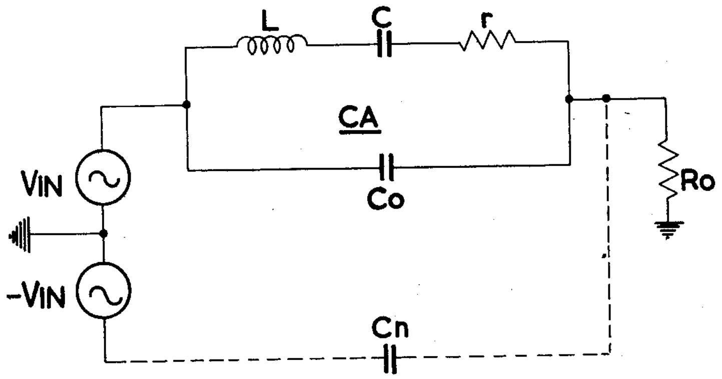
Figure 3:
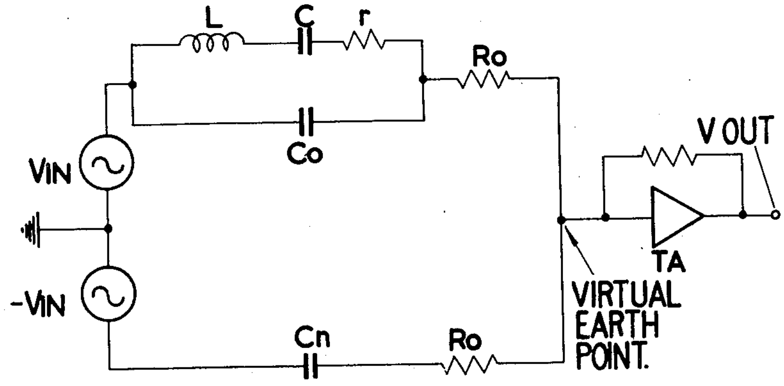
Figure 4:
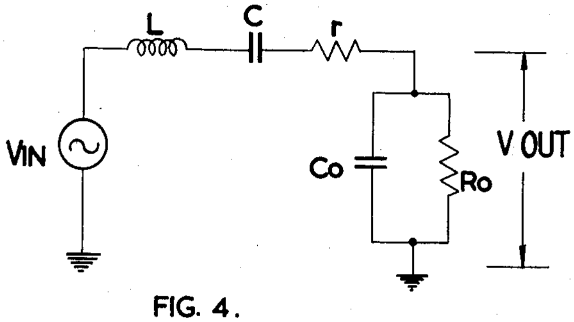
Figure 5:
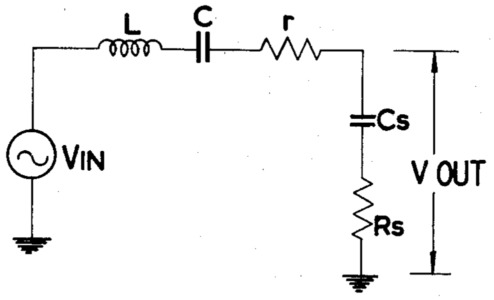
Figure 7:
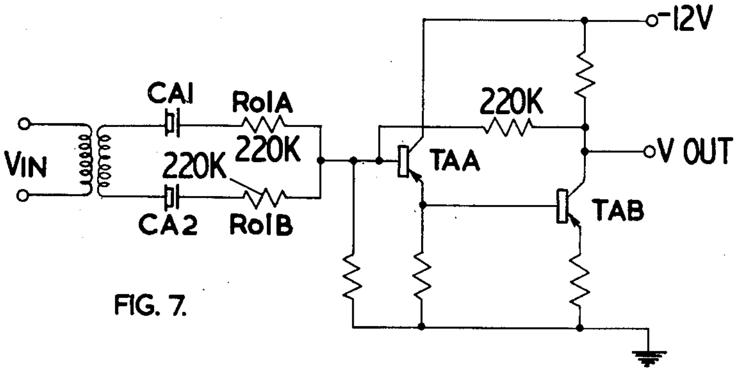
Figure 6:
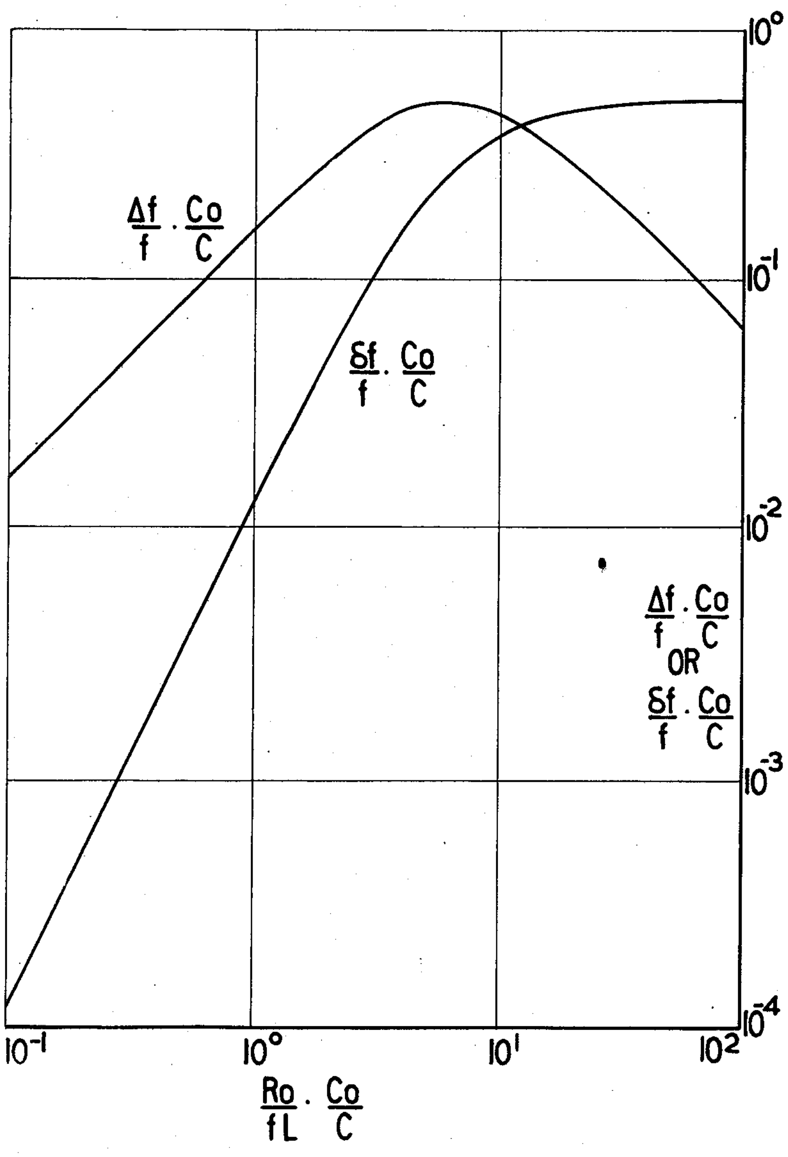
Figure 8:
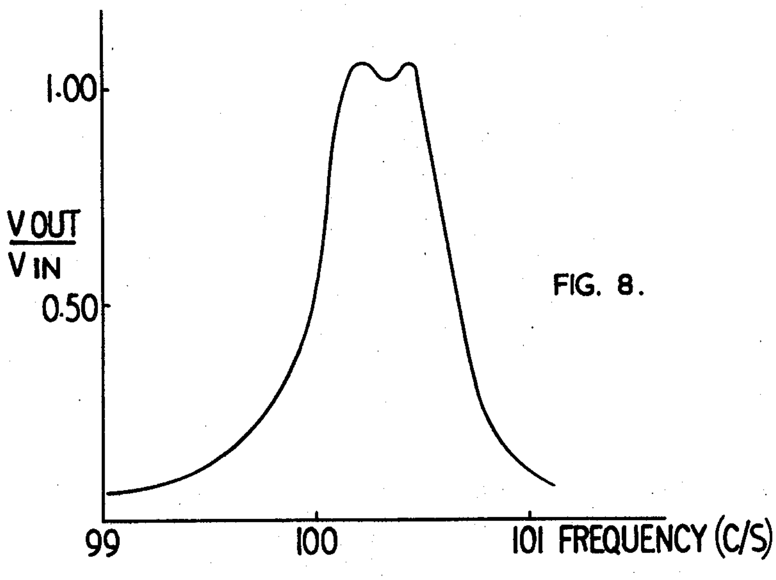
Figure 9:
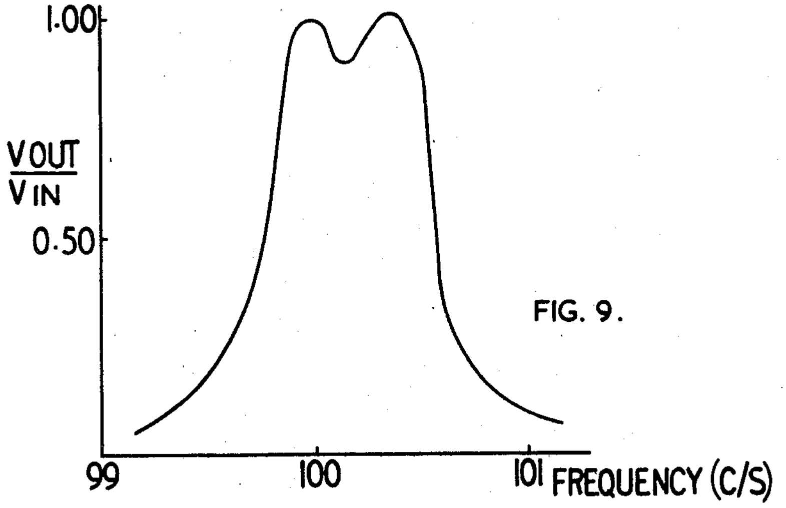
Figure 10:
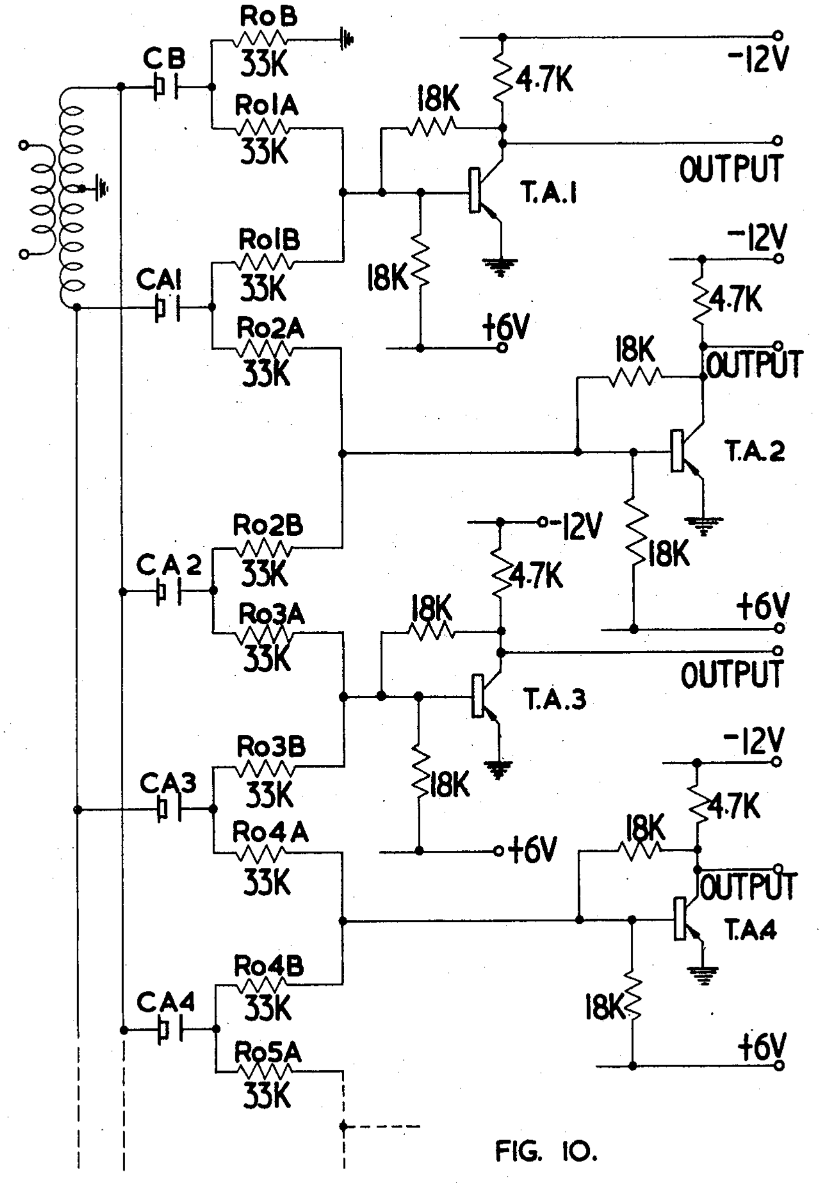

In order to make the invention clearer some general theoretical and computational discussion on single and multiple filters will now be given together with examples of one- and two-crystal filters and a multiple filter bank. Reference will be made to the drawings accompanying this specification in which:

FIG. 1 shows schematically the circuit of a simple crystal filter element,

FIG. 2 shows schematically a circuit arrangement for neutralising the parallel resonance of the circuit of FIG. 1, FIG. 3 shows schematically a circuit arrangement of a simple crystal filter according to the invention, FIG. 4 shows a simplified, equivalent circuit of the arrangement of FIG. 3, FIG. 5 shows the series equivalent circuit of a crystal element and its resistive termination, FIG. 6 shows a computed graph useful in understanding the invention, FIG. 7 shows schematically the circuit arrangement of a two-crystal filter, FIGS. 8 and 9 show response curves for pairs of crystals in a half-lattice filter, and, FIG. 10 shows schematically the circuit arrangement of a multiple filter bank.

In FIG. 1 is recalled the equivalent circuit of a quartz crystal resonator. This simple circuit describes in electrical terms, the performance of the crystal about its fundamental resonant frequency. There are also subsidiary and harmonic modes in which the crystal may oscillate and these may be represented by adding series tuned circuits in parallel with the circuit of FIG. 1. The equivalent circuit is characterised by a very high value of the ratio $L/C$ and small resistive loss, resulting in a very high Q factor. Crystals can be supplied in a wide range of inductance to suit particular circuit requirements and a typical value for a 100 kc./s. X-cut bar might be 50 henries. It has been shown in "Vigoureux, P., and Booth, C. F.: 'Quartz Vibrators and Their Applications.' (H.B.M. Stationery Office, London, 1950)," that the theoretical minimum for the ratio $Co/C$ is about 125 and X-cut bars, which are used in the region of 50–200 kc./s., approach this figure more closely than those of any other cut; 140 would be a typical value. Crystal Q depends largely on the method of mounting; units sealed in vacuum show the higher values, typically 10 for an X-cut bar. Because high Q is generally sought after and the effect of the parallel capacitance $Co$ may be undesirable in some applications, it has been found useful to define a factor of merit, $$\rho=Q\frac{C}{Co}$$

It will be clear from the circuit of FIG. 1 that the crystal will exhibit both series and parallel resonance at angular frequencies of $$\omega o=1/\sqrt{LC} \text{ and } \omega\alpha=1/\sqrt{\frac{LCCo}{C+Co}}$$

respectively. The parallel resonant frequency will differ from the series resonant frequency by 1 part in $2Co/C$ and because $Co/C$ cannot be less than 125, this difference cannot be greater than 0.4%.

For a full general treatment of the quartz resonator the reader is referred to a standard work on the subject, for example, the Vigoreaux and Booth reference above and "Heising, R. A.: 'Quartz Crystals for Electric Circuits.' (D. Van Nostrand Co. Inc., New York 1946)."

FIG. 2 shows a simple filter circuit in which a signal source $Vin$ of zero impedance feeds a quartz crystal CA, and its resistive termination R$o$. Neglecting the neutralising arm C$n$ (shown dotted) and assuming that $$Ro<<1/(\omega Co)$$

the filter will dispay a response having a single peak at $\omega o=1\sqrt{LC}$ and a deep notch or crevasse at $$\omega\alpha=1/\sqrt{LCCo/(C+Co)}$$

which frequencies differ by not more than 0.4% as previously explained. The bandwidth to the −3 db points, $\Delta f$, will be given by $fo/\Delta f = \omega oL/(Ro+r)$.

In order to eiminate the effect of the parallel resonance and achieve a symmetrical response from the filter a neutralising capacitor C$n$, fed in anti-phase to the crystal arm, is used. If the notch be eliminated a symmetrical response will result. In practice it is sometimes found useful purposely to place the notch at a frequency where high attenuation is desired. This can be either on the high frequency or the low frequency side of the peak by under or over-neutralising, respectively.

Consideration of the circuit of FIG. 2 will show that, although the effect of parallel resonance is eliminated when $Cn = Co$, both these capacitances are virtually across the terminating resistor R$o$, so that the termination cannot be considered as purely resistive. In the next section it will be shown that there is a limit to the bandwidth which can be realised by increasing R$o$, and this occurs when the value of the terminating resistor R$o$ is numerically equal to the capacitive reactance across it, in this case when $Ro = 1/2\omega Co$. Also the input capacity of the device into which the filter is fed will reduce the maximum bandwidth still further. To achieve the widest bandwidths, therefore, it is necessary to minimise the capacitance which would virtually shunt the terminating resistor R$o$. This is done by choosing a crystal with a low ratio of parallel C$o$ to series capacitance C, by isolating the neutralising arm C$n$ in some way and by devising a termination which will, in practice, offer very little additional shunt capacitance.

A circuit arrangement which resolves these difficulties is shown in FIG. 3. It will be seen that the arrangement exploits the virtues of a virtual-earth feedback amplifier TA (or a virtual ground operational amplifier, as it is referred to on page 25 in Section 1–13 of "Pulse and Digital Circuits," Millman and Taub, McGraw-Hill), i.e., an amplifier providing a virtual-earth input point at its operating frequency band, in providing an accurately determined resistive termination for the crystal with very little additional stray capacitance. Because the effect of the parallel resonance of the crystal is neutralised by means of an arm which is isolated from the crystal itself, and assuming that a perfect virtual-earth exists at the input of the amplifier TA, the circuit is equivalent to that shown in FIG. 4. The termination is now the parallel combination of R$o$ and C$o$ and, at a given frequency, this can be equated in terms of impedance and phase angle to a series combination of R$s$ and C$s$. FIG. 5 shows the series equivalent circuit of the crystal and its resistive termination.

The Q of this simple filter circuit will be given by $Q = \omega oL/(Rs+r) = fo/\Delta f$ where $\Delta f$ is the bandwidth to the −3 db points of the response curve.

If the series resonant frequency of the crystal is given by $\omega o = 1/\sqrt{LC}$, then the centre frequency of the filter will be greater than this by 1 part in $2Cs/C$, because the net series capacitance of the circuit has been reduced by 1 part in $Co/C$.

By using the principle of equality of impedance and equating real and imaginary parts of the resulting expression it can be shown that $$Rs = Ro/(\omega^2Co^2Ro^2+1) \quad (1)$$

$$\text{and } 1/\omega Cs = \omega CoRo^2/(\omega^2Co^2Ro^2+1) \quad (2)$$

$$\text{Hence } \omega CsRs = 1/(CoRo) \quad (3)$$

Solving (1) for R$o$ and putting $\omega L = 1/\omega C$ and $Rs = \omega L\Delta f/\rho$ we have $$Ro = \omega L\cdot C/Co[f/2\Delta f\cdot C/Co \pm (f^2/4\Delta f^2\cdot C^2/Co^2 - 1)^{1/2}] \quad (4)$$

$$\text{Hence } (Ro/fL)(Co/C) = 2\pi[f/2\Delta f\cdot C/Co \pm (f^2/4\Delta f^2\cdot C^2/Co^2 - 1)^{1/2}] \quad (5)$$

This nondimensional expression gives the value of the terminating resistor required in terms of filter bandwidth frequency and the crystal equivalent inductance and the ratio of series to parallel capacitance. A graph of $$(Ro/fL)(Co/C)$$

against $(\Delta f/f)(Co/C)$ has been computed and is shown in FIG. 6.

The centre frequency of the filter will be pulled from the series resonant frequency of the crystal by 1 part in $2Cs/C$ as previously explained, so that the frequency shift $\delta f$, i.e., the frequency by which the capacitor C$o$ pulls the resonant frequency of the crystal away from its basic resonant frequency, will be given by $(\delta f/f) = (C/2Cs)$.

But from the expression (2)

$$Cs = (\omega^2Co^2Ro^2+1)/(\omega^2CoRo^2)$$

$$\text{so that } \delta f/f = \tfrac{1}{2}\cdot\omega^2CoRo^2C/(\omega^2Co^2Ro^2+1) \quad (6)$$

and putting $\omega^2 = 1/LC$ we have that $$\delta f/f = \frac{1}{2}\{C/Co\}\left\{1/\left[1+\left(\frac{\omega L}{Ro}\cdot\frac{C}{Co}\right)^2\right]\right\} \quad (7)$$

Hence $$(\delta f/f)(Co/C) = \frac{1}{2}\cdot 1/\left[1+\left(\frac{\omega L}{Ro}\cdot\frac{C}{Co}\right)^2\right] \quad (8)$$

This non-dimensional expression gives the amount of frequency pulling in terms of the terminating resistor R$o$, frequency and the crystal equivalent inductance and the ratio of series to parallel capacitance. A graph of $(\delta f/f)(Co/C)$ against $(Ro/fL)(Co/C)$ has been computed and is shown in FIG. 6.

Certain results follow upon examination of the preceding work

From (*1*) $Rs = Ro/(\omega^2Co^2Ro^2+1)$ and because $Rs = \omega L\Delta f/f$ (if $Rs >> r$)

$$\text{then } \Delta f/f = (Ro/\omega L)/(\omega^2Co^2Ro^2+1) \quad (9)$$

This expression will attain a maximum when R$o$ is varied, the condition for which can be found by differentiating $\Delta f/f$ with respect to R$o$ and equating to zero.

$$d[\Delta f/f]/dRo = \left[(\omega^2Co^2Ro^2+1)\frac{1}{\omega L} - \frac{Ro}{\omega L}\cdot 2\omega^2Co^2Ro^2\right]/[(\omega^2Co^2Ro^2+1)^2+1] = 0$$

$$\therefore \frac{1}{\omega L}(\omega^2Co^2Ro^2+1) = \frac{Ro}{\omega L}\cdot 2\omega^2Co^2Ro$$

Hence $\omega^2Co^2Ro^2 = 1$ $$\text{and } Ro = 1/\omega Co \quad (10)$$

Putting (10) into expression (1) we have $$Rs = Ro/2 \quad (11)$$

The maximum bandwidth obtainable is therefore given by $$\Delta f/f = Ro/2\omega L = C/2Co \quad (12)$$

The theoretical minimum for $Co/C$ has been given as *125*, so that the theoretical minimum for filter Q will be *250*.

For all values of $\Delta f/f$ less than the maximum there will be two values of R$o$ which will give the same bandwidth although the pulling frequencies will be different.

From (8) the pulling frequency, $\delta f$, is given by $$(\delta f/f)(Co/C) = \frac{1}{2}\cdot 1/\left[1+\left(\frac{\omega L}{Ro}\cdot\frac{C}{Co}\right)^2\right]$$

Given that $Ro = 1/\omega Co$, the condition for maximum bandwith, and putting $Rs = Ro/2$ and $C/Co = Ro\omega L$ expression (8) can be rewritten $$(\delta f/f)(\omega L/Rs) = \tfrac{1}{2} \quad (13)$$

and putting $$f/\Delta f = \omega L/Rs$$

Hence $(\delta f/f)(f/\Delta f) = \tfrac{1}{2}$ $$\delta f = \Delta f2 \quad (14)$$

When the terminating resistor, R$o$, is very large then expression (8) becomes $\delta/f=C/2Co$ which gives, of course, the maximum pulling possible.

By using the graph of FIG. 6 as a design tool a one-crystal filter can be made having any circuit Q down to a theoretical minimum of 250 and using any crystal equivalent inductance. In practice the lowest Q will be achieved using X-cut bars because the ratio of parallel to series capacitance of these units approaches the theoretical minimum of 125 more closely than any other sort. This limits the usefulness of the technique, where the largest bandwidths are sought, to the region of 50–200 kc./s. Above 200 kc./s. CT and DT cuts are used whose ratio of parallel to series capacitance has been found to be more than double that of X-cut bars, and above 500 kc./s. where ET cuts are used this ratio is very high indeed. It would seem, therefore, that the largest bandwidths will be realised at 200 kc./s., approaching the theoretical maximum of 800 c./s. within 20%. To achieve the largest bandwidths it is necessary to keep down any stray capacitance which would add to the crystal parallel capacitance. To this end the lower inductance crystals are to be preferred because any stray capacitance would then be a smaller fraction of the higher parallel capacitance of the crystal.

The theoretical work described above neglects the series resistance of the crystal, the output impedance of the source from which the filter is fed and the impedance of the virtual-earth of the feedback amplifier. The series resistance of the crystal is usually a very small fraction of the total external resistance of the circuit whilst the source impedance and virtual-earth impedance are in the hands of the designer and can be made small enough to be insignificant. However the effect of these additional elements of impedance can be allowed for when interpreting the graph of FIG. 6 in the following way. The terminating resistor, R$o$, as read on the graph can be taken to include both the output impedance of the source and the impedance of the virtual-earth (both assumed relative) so that the actual terminating resistor used may be a little less than R$o$. The effect of the series resistance of the crystal will be to increase the bandwidth by the factor $(1+r/2\pi\Delta fL)$ so that this factor may be taken into account when bandwidth is read on the graph.

An experiment was undertaken to determine the largest bandwidth one could achieve using typical commercial quartz crystals. A number of units in the region of 100 kc./s. were available all of which were mounted in evacuated glass envelopes intended for use with B7G valve bases. The crystal equivalent inductance was 62 henries and the series resistance averaged about 400 ohm. The parallel capacitance, measured without a base, was 7.0 pF and from these results the ratio of parallel to series capacitance was calculated to be 147. To avoid increasing this ratio unnecessarily the crystals were used without bases, direct connection being made to the pins of the crystal unit. Experiments showed that the maximum bandwidth which could be achieved with these crystals at 100 kc./s. was 300 c./s. It has been shown previously in this text that the maximum bandwidth obtainable is given by $\delta f/f=C/2Co$.

Taking the measured value for the ratio of parallel to series capacitance as 147 the maximum bandwidth to be expected would be given by $$\Delta f=(f/2)(C/Co)=10^5/(2\times 147)=340 \text{ c./s.}$$

Because a bandwidth of 300 c./s. was achieved the additional stray circuit capacitance must have been 0.6 (340/300−1)=0.8 pF. The terminating resistors used were ½W, cracked carbon, high stability type which, by measurement, shows a shunt capacitance of less than 0.5 pF.

Having obtained a bandwidth of 300 c./s. for a single crysal filter, a half-lattice two-crystal filter was tried. Two pairs of crystals were available for these tests, one pair spaced by 400 c./s. and another pair spaced by 510 c./s. The circuit arrangement is shown in FIG. 7. Two transistors TAA, TAB, were used in the amplifier for these experiments in order to bring the input impedance of the device up to a value many times greater than the impedance of the virtual-earth. In practice the two transistors TAA, TAB may be replaced by one pentode valve or by one transistor with a lower value of feedback resistor giving less amplification overall. For the largest bandwidths the lowest practical crystal equivalent inductance should be used; this would scale down the impedance of the whole circuit to a level most suitable for use with transistors. Neutralisation for the crystals is mutual.

The response curves for the narrower spaced and the wider spaced crystals are shown in FIGS. 8 and 9 respectively. It has been shown that when the condition for maximum bandwidth has been obtained the centre frequency of the filter is pulled upward from the series resonant frequency of the crystal by $\Delta f/2$. It can be seen from FIGS. 8 and 9 that the response curves have been shifted upwards from the resonant frequencies of the crystals by about 150 c./s.

An example of a multiple filter bank arrangement is shown in FIG. 10. The complete unit, only part is shown for brevity, comprising 64 channels, covers a spectrum from 100.0 to 106.4 kc./s. Each filter, when considered separately, comprises two crystals (e.g. CB, CAL) connected in a half-lattice arrangement exhibiting a flat-topped response and a bandwidth of 100 c./s. to the −1 db points. But, because each crystal is shared between adjacent channels there need in principle be only 64+1 crystals in the bank. In practice, however, it has been found convenient to build up the circuits on printed boards carrying 16 complete filters on each so that there are 16+1 crystals on each board making 64+4 crystals in all. Each channel is well isolated from its neighbour by the very low impedance (virtual-earth) which exists at the inputs of the amplifiers TA. In practice, there is no apparent effect on the performance of any channel by the presence of its neighbours.

The crystals were manufactured to the following specification. Equivalent inductance, 30 henries ±5%. Ratio of parallel to series capacitance, not greater than 150 with a tolerance of ±5% on the parallel capacitance. The units are mounted in glass tubes 5 cm. long x 1 cm. dia., filled with nitrogen and fitted with flexible leads. Very high Q was not necessary and, as supplied, the crystals showed an equivalent series resistance of 1KΩ. A ratio of parallel to series capacitances of 140 was realised. When designing the component layout attention was paid to reducing the stray capacity shunting the terminating resistors. It was found that, with all components mounted, the total stray capacity was not greater than 1 pF.

In the general field of video frequency spectrum analysis there is frequently a demand for complete analysis of the components in a given frequency range in a given short period of time. When a single frequency-sweeping filter is used for this purpose there is a natural limitation on frequency resolution set by the response time of the filter itself, its bandwidth must be wide enough to permit one complete sweep of the spectrum to be made in the time available without serious loss of output. To overcome this limitation and to enable rapid examinations of large spectra to be made, multiple filter banks of the kind described can be used. Such banks comprise a group of narrow-band filters, spaced in frequency by the nominal filter bandwidth, into which a spectrum of signals and noise is fed. (Each filter is then followed by a detector and integrator.) A fast electronic switch samples the outputs of all channels, feeding the information into a common indicating device. A new limitation on frequency resolution is then set solely by the period of the phenomenon which warrants investigation.

Important in the design of multiple filter banks are equality of gain and noise equivalent bandwidth from one channel to another, ratio of noise equivalent bandwidth to filter speration, and, because of the large number of channels required, simplicity and economy of circuit. The basic design technique already described in this text lends itself to the practical solution of these problems for the filter characteristics are almost completely dependent on the parameters of the quartz resonator and two high stability resistors and the circuit is simple and "designable" within a wide range of bandwidths likely to be required for many applications in practice. Further, the use of a virtual-earth amplifier has led to the development of a crystal sharing technique which for a dual element filter, has realised a saving of 50% in quartz.

The common drive source from which a multiple filter bank would be fed must meet certain special requirements. The source impedance must be low to avoid mutual interaction between channels. The drive amplifier should include a bandpass filter giving constant output within the frequency range of the bank and good rejection outside this band. This is necessary to attenuate the unwanted harmonic resonances of the filter crystals, against which the basic design affords no protection, and to limit the amount of noise power which the amplifier need handle. The load presented to the drive source will approximate to the series combination of the crystal parallel capacitive reactance and the terminating resistor divided by the number of channels in the bank. These demands on the drive amplifier may be more easily met if a large spectrum were divided up into smaller units. By means of appropriate frequency changing the subunits and their drive amplifiers could then be identical; this would ease servicing and spare-carrying problems as well as providing some flexibility in overall equipment design.

A crystal filter design for typical multi-channel equipment, gave simplicity and economy of circuit combined with equality of characteristics from one channel to another; these features were of prime importance. Equality of relative bandwidths and gains was achieved without resorting to complex alignment procedures or the use of pre-set controls. It will be appreciated that a requirement to adjust each filter separately in a system comprising several hundred channels would not only increase the first cost of the equipment but might prove to be a considerable embarrassment in subsequent service.

An additional advantage is the equality of phase characteristics which is obtained between channels.

What I claim is:

1. A crystal filter circuit comprising:

a crystal filter element fed from an input signal source and itself feeding to an amplifier of the virtual-earth type;
an input series resistance to the amplifier providing a resistive termination for the crystal filter element;
and an antiphase neutralising capacitative path having a series resistance corresponding in value to the resistive value of the resistive termination and connected between the input signal source and the virtual-earth point of the amplifier.

2. A filter as in claim 1 wherein each filter element is an X-cut quartz crystal bar.

3. A crystal filter comprising:
a pair of crystal filter elements each connected in a separate series circuit with a terminating resistor;
and means for feeding the elements in antiphase from an input signal source;
wherein the output of each element is connected through its terminating resistor to the virtual-earth point of a common virtual-earth feedback amplifier;
each terminating resistor constituting a separate series input resistor as the output of each filter element for the feedback amplifier.

4. A filter as in claim 3 wherein each filter element is an X-cut quartz crystal bar.

5. A multiple filter bank of $n$ filters comprising:
a parallel sequence of $n+1$ crystal filter elements;
means for feeding alternate elements in phase and antiphase from a common signal source;
each element feeding to a common connection of a pair of terminating resistors;
and $n$ amplifiers of the virtual-earth type;
wherein the terminating resistors at the beginning and end of the sequence are connected to a point of earth potential;
the other resistors are connected in pairs in order along the sequence after the earthed resistor at the beginning;
and the connection from each pair is connected to the virtual earth point of a different one of the feedback amplifiers.

6. A filter as in claim 5 wherein each filter element is an X-cut quartz crystal bar.

References Cited by the Examiner

UNITED STATES PATENTS

| | | | |
|---|---|---|---|
| 2,266,658 | 12/1941 | Robinson | 330—174 X |
| 2,510,868 | 6/1950 | Day | 330—174 X |
| 2,910,657 | 10/1959 | True | 330—174 X |

ROY LAKE, *Primary Examiner.*